Figure 1:
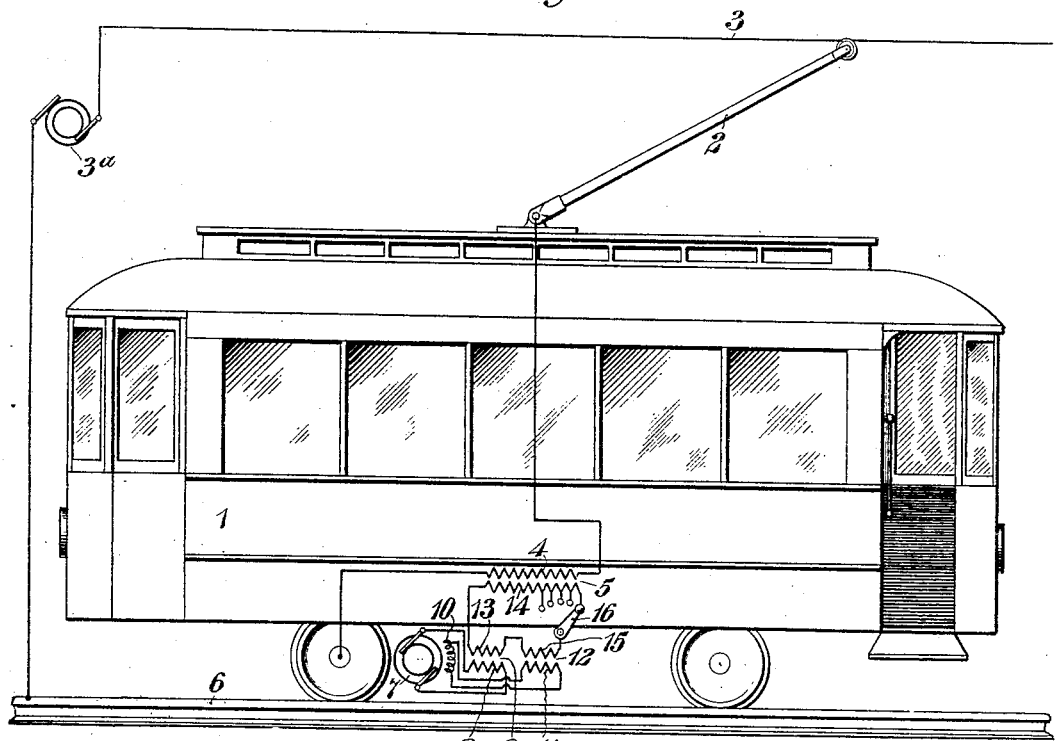

No. 765,203. PATENTED JULY 19, 1904.
C. F. SCOTT.
ALTERNATING CURRENT ELECTRICAL APPARATUS.
APPLICATION FILED SEPT. 13, 1902.
NO MODEL.

WITNESSES:
C. L. Belcher
J. C. Morse.

INVENTOR
Charles F. Scott
BY Wesley G. Carr
ATTORNEY

No. 765,203.

Patented July 19, 1904.

UNITED STATES PATENT OFFICE.

CHARLES F. SCOTT, OF PITTSBURG, PENNSYLVANIA, ASSIGNOR TO WESTINGHOUSE ELECTRIC & MANUFACTURING COMPANY, A CORPORATION OF PENNSYLVANIA.

ALTERNATING-CURRENT ELECTRICAL APPARATUS.

SPECIFICATION forming part of Letters Patent No. 765,203, dated July 19, 1904.

Application filed September 13, 1902. Serial No. 123,346. (No model.)

*To all whom it may concern:*

Be it known that I, CHARLES F. SCOTT, a citizen of the United States, residing at Pittsburg, in the county of Allegheny and State of Pennsylvania, have invented a new and useful Improvement in Alternating-Current Electrical Apparatus, of which the following is a specification.

My invention relates to the construction, operation, and control of single-phase alternating-current motors in which commutators are employed and in which a series relation or its equivalent is provided and maintained between the field-magnet and armature windings.

The object of my invention is to provide a means whereby the desired relation between the armature and field-magnet windings in single-phase motors may be maintained and at the same time a different amount of current may be supplied to the armature-winding from that which is supplied to the field-magnet winding.

It has been proposed prior to my invention to use single-phase alternating-current energy for operating motors in which the field-magnet and armature windings are connected in series and to vary the speed of operation of such motors by varying the electromotive force supplied thereto. In such cases, however, it has not been possible to supply the field-magnet windings and the armature-windings with different amounts of current, whereas the design and operation of motors of this character make it desirable in certain cases and under certain circumstances to utilize different currents in the two members of the motor and at the same time to maintain a constant and definite ratio between the currents in the two members, so that any variation in the current in one may be accompanied by a proportionate variation in the other, thus rendering the operation of the motor similar to that of an ordinary series motor. I have devised means for accomplishing this result, in which I employ one or more series transformers. It is well known that the currents in the primary and the secondary circuits of such a transformer bear a constant ratio, which in turn depends upon the ratio between the turns in the primary and secondary windings. If the primary winding of such a transformer be connected in the supply-circuit and the secondary circuit be connected to one element of the motor, then the current in the latter will be proportional to that in the supply-circuit; but its absolute amount may be either greater or less, depending upon the windings. A series transformer may be employed with either element of the motor, and the other may be connected directly in the supply-circuit, or two series transformers may be employed, one for each element of the motor. The series transformer or transformers may be either of the ordinary two-coil type or of the single-coil type.

Means for carrying out the invention are shown in the accompanying drawings, in which—

Figure 2:
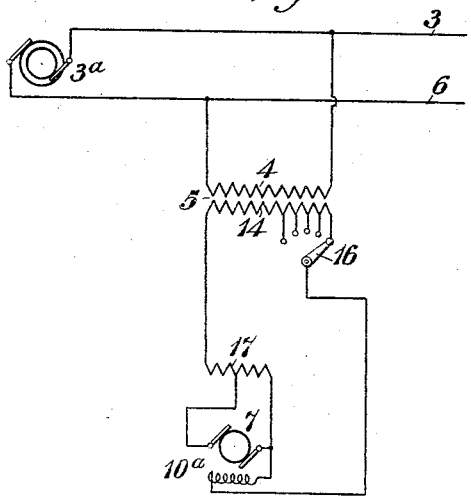
Figure 3:
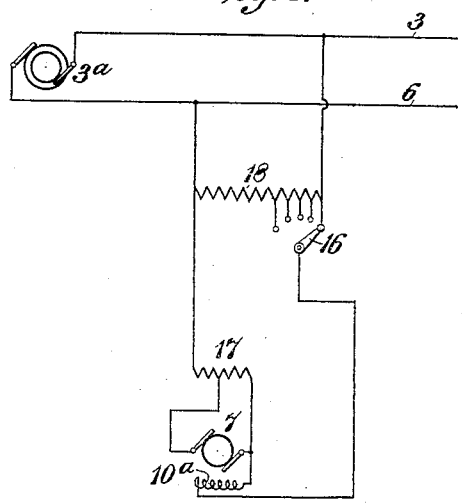

Figure 1 is a side elevation of a railway-vehicle provided with a propelling-motor and a controller, the windings of the motor and the controlling apparatus being shown diagrammatically. Fig. 2 is a diagram of a modification of motor and controller circuits; and Fig. 3 is a diagram similar to Fig. 2, but showing a further modification.

Referring now to Fig. 1, the car 1 is shown as provided with a trolley 2, which takes current from an overhead conductor 3, supplied with energy from a single-phase alternating-current generator $3^a$, and as connected to one terminal of the primary winding 4 of a transformer 5, mounted on the car, the other terminal of the primary winding of the transformer being connected to the return-conductor, here indicated as the rails 6. It will be understood that what is known as a "third-rail" construction may be employed instead of the overhead trolley indicated, that the supply-conductor may be either continuous or sectional, that it may be located in a slotted conduit or otherwise disposed, and that a complete metallic circuit instead of a rail and ground return may also be utilized. The arrangement here shown is merely indicative of any suitable means for supplying energy to a single-phase motor or to a plurality of such motors and to controlling apparatus constructed and arranged in accordance with my invention whether the motors be used for railway or other purposes. The motor-armature 7 is shown as connected in series with the secondary 8 of a transformer 9, and the field-magnet 10 is shown as connected in series with the secondary 11 of a transformer 12. The primary 13 of the transformer 9 has one terminal connected to one terminal of the secondary winding 14 of the main transformer 5, and its other terminal is connected to one terminal of the primary 15 of the transformer 12, the other terminal of the primary 15 being connected to a switch-arm 16, which is so constructed and arranged as to vary the active length of the secondary winding 14 of the transformer 5, and thus vary the voltage impressed upon the windings 13 and 15. The local supply-circuits, which respectively include the field-magnet winding 10 and the armature 7, provide a series relation for the armature and field-magnet by reason of the fact that the primary windings 13 and 15 of the transformers 9 and 12 are connected together in series. Any desired ratio between the current in the armature and that in the field-winding may be secured by placing suitable numbers of turns upon the two series transformers in accordance with well-known laws.

In Fig. 2 the main conductors 3 and 6 are or may be the same as shown in Fig. 1, and the windings 4 and 14 of the transformer 5 and the switching devices 16 are shown as substantially the same as the corresponding parts in Fig. 1. In this modification, however, an autotransformer 17 is connected in series with the field-magnet winding $10^a$ in the local supply-circuit and the secondary portion of the autotransformer-winding is connected across the terminals of the armature 7. By means of this arrangement the current in the armature-winding will be greater than that in the field-magnet winding. The advantage in this arrangement resides in the fact that the current supplied to the combination of field-magnet, armature, and transformer windings may be much less and the voltage materially higher than would be possible if the transformer were omitted and the field-magnet were wound to take the same current as that which passes through the armature-winding, it being a fixed condition that the armature current and voltage shall not exceed a certain predetermined value.

The voltage across the combination of parts when the transformer is used may, if necessary, be two or three times as high as that which would be possible if the transformer were not used. It may be possible, therefore, to supply the combination directly from the controller and in certain cases directly from the main circuit. The latter arrangement is shown in Fig. 3, in which a single winding 18 is connected across the supply-circuit, and its active length is varied by means of the switching device 16, instead of interposing a two-coil transformer at this point. The arrangement of armature 7, field-magnet $10^a$, and transformer 17 is the same in this figure as in Fig. 2. It will be seen that the voltage may be varied with this arrangement the same as with the arrangement shown in the preceding figures, but that when the switching device 16 is in the position indicated in the drawings the full voltage of the supply-circuit is impressed upon the motor and the autotransformer.

It will be understood that inasmuch as the apparatus and circuits are shown diagrammatically they may be made to conform to standard practice. For example, the simple switch-arm and contact-points indicated for varying the voltage impressed upon the motor are obviously indicative of suitable controlling apparatus such as would be adapted to successful commercial operation and the utilization of such currents and voltages as would be employed in practice.

With the system here shown and described a high line voltage may obviously be employed, and such voltage may be reduced to any desired degree for supplying the motor or motors, and the rate of alternations and the amount of current may be also such as are found adapted to practical service.

As already intimated, two or more motors may be connected either in series or in parallel, as may be found desirable. It is to be further understood that the invention is not limited to railway systems and that the variation of the voltage which is applied to the motor or motors may be effected by any known means other than that here specifically shown, if desired.

I claim as my invention—

1. The combination with a single-phase alternating-current motor, of means for maintaining a constant ratio between the currents in the armature and in the field-magnet windings of the motor and at the same time supplying said windings with different amounts of current.

2. The combination with a single-phase alternating-current motor, of a supply-circuit for the motor and a transformer between the armature and the supply-circuit by means of which the armature may be supplied with a different amount of current from that supplied to the field-magnet and a constant ratio maintained.

3. The combination with a single-phase alternating-current motor, of a supply-circuit containing a transformer having a winding which is connected across the motor-armature and a winding which is connected in series with the field-magnet winding, said windings being so proportioned and disposed as to afford a constant ratio between the armature and field currents.

4. The combination with a single-phase alternating-current motor, of a source of energy, a local supply-circuit, means for varying the electromotive force of said supply-circuit and an autotransformer in said local supply-circuit having its winding connected in series with the motor-field winding and having the secondary portion of its winding connected across the armature-terminals.

5. The combination with a single-phase alternating-current motor, of a supply-circuit, means for varying the electromotive force of said supply-circuit and an autotransformer in the supply-circuit having its winding connected in series with the motor-field winding and having the secondary portion of its winding connected across the armature-terminals.

6. The combination with a single-phase alternating-current motor and a supply-circuit, of means for varying the electromotive force of said supply-circuit and one or more series transformers connecting the supply-circuit with the motor in such manner that the armature and field-magnet windings may be supplied with different amounts of current which bear a constant ratio to each other.

In testimony whereof I have hereunto subscribed my name this 8th day of September, 1902.

CHARLES F. SCOTT.

Witnesses:
JAMES B. YOUNG,
WESLEY G. CARR.